(12) United States Patent
Paruszkiewicz, Jr. et al.

(10) Patent No.: US 7,637,531 B2
(45) Date of Patent: Dec. 29, 2009

(54) VEHICLE SEAT SIDE AIR BAG ASSEMBLY

(75) Inventors: William J. Paruszkiewicz, Jr., Clinton Township, MI (US); James B. Clauser, Rochester Hills, MI (US); Thomas A. Welch, Sr., Ortonville, MI (US)

(73) Assignee: Lear Corporation, Southfield, MI (US)

( * ) Notice: Subject to any disclaimer, the term of this patent is extended or adjusted under 35 U.S.C. 154(b) by 248 days.

(21) Appl. No.: 11/531,289

(22) Filed: Sep. 13, 2006

(65) Prior Publication Data

US 2008/0061539 A1 Mar. 13, 2008

(51) Int. Cl.
*B60R 21/20* (2006.01)
(52) U.S. Cl. ................................. 280/730.2
(58) Field of Classification Search ............. 280/728.1, 280/728.2, 728.3, 730.2
See application file for complete search history.

(56) References Cited

U.S. PATENT DOCUMENTS

| 5,498,030 | A | * | 3/1996 | Hill et al. ............. 280/743.1 |
| 5,678,853 | A | | 10/1997 | Maly |
| 5,749,597 | A | | 5/1998 | Saderholm |
| 5,810,389 | A | | 9/1998 | Yamaji et al. |
| 5,816,610 | A | | 10/1998 | Higashiura et al. |
| 5,860,673 | A | | 1/1999 | Hasegawa et al. |
| 5,890,734 | A | | 4/1999 | Saderholm |
| 5,927,749 | A | | 7/1999 | Homier et al. |
| 5,938,232 | A | | 8/1999 | Kalandek et al. |
| 5,967,546 | A | | 10/1999 | Homier et al. |
| 5,967,603 | A | | 10/1999 | Genders et al. |
| 5,992,878 | A | * | 11/1999 | Narita et al. ............. 280/730.2 |
| 5,997,032 | A | | 12/1999 | Miwa et al. |
| 6,045,151 | A | | 4/2000 | Wu |
| 6,206,410 | B1 | | 3/2001 | Brown |
| 6,237,934 | B1 | | 5/2001 | Harrell et al. |
| 6,254,122 | B1 | | 7/2001 | Wu et al. |
| 6,352,304 | B1 | | 3/2002 | Sorgenfrei |
| 6,467,801 | B1 | * | 10/2002 | Preisler et al. ........... 280/728.3 |
| 6,588,838 | B1 | | 7/2003 | Dick, Jr. et al. |

FOREIGN PATENT DOCUMENTS

| WO | 00/09365 A1 | | 2/2000 |
| WO | WO 00/09365 A1 | * | 2/2000 |

* cited by examiner

*Primary Examiner*—Paul N Dickson
*Assistant Examiner*—Robert A Coker
(74) *Attorney, Agent, or Firm*—Brooks Kushman P.C.

(57) ABSTRACT

A vehicle seat air bag assembly (17) having an air bag module (18) includes an air bag guide (42) of a synthetic plastic having an inner end (44) secured to a seat frame (24) and also having a tubular portion (46) that extends from the inner end adjacent the air bag module (18) toward a deployment seam (34) of a seat trim cover (32). The air bag guide tubular portion (46) guides an air bag of the air bag module (18) during inflation and movement to the trim cover deployment seam (34).

14 Claims, 4 Drawing Sheets

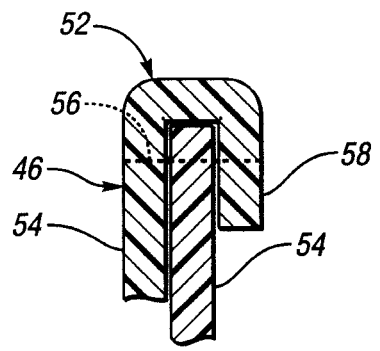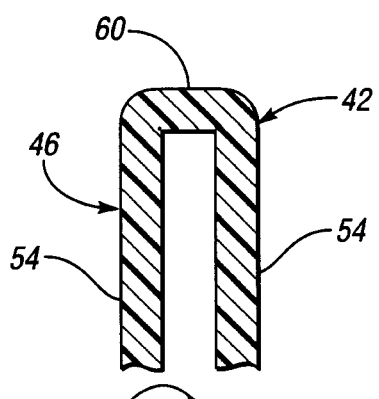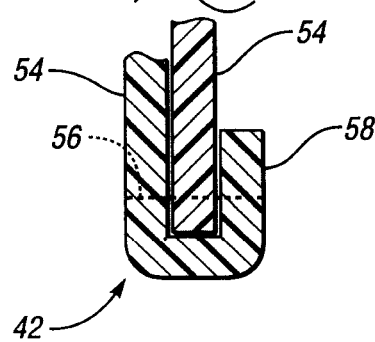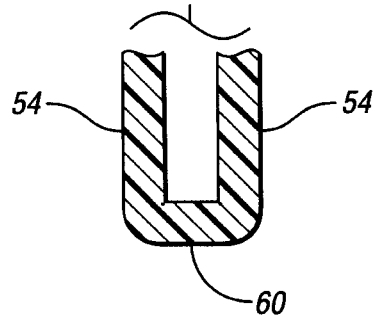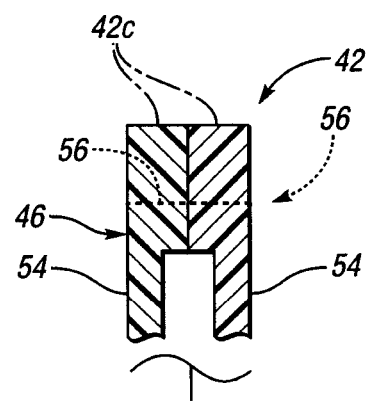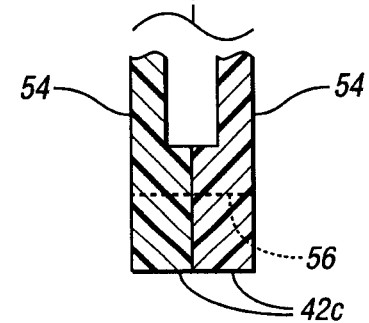
Fig. 6
Fig. 7
Fig. 8

VEHICLE SEAT SIDE AIR BAG ASSEMBLY

BACKGROUND OF THE INVENTION

1. Field of the Invention

This invention relates to a vehicle seat side air bag assembly having an air bag guide for guiding an air bag for deployment during use.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the seat component outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

Other prior art references noted during an investigation conducted for this invention include United States patents: U.S. Pat. No. 5,678,853 Maly; U.S. Pat. No. 5,749,597 Saderholm; U.S. Pat. No. 5,810,389 Yamaji et al.; U.S. Pat. No. 5,927,749 Homier et al.; U.S. Pat. No. 5,967,546 Homier et al.; U.S. Pat. No. 5,967,603 Genders et al.; U.S. Pat. No. 5,997,032 Miwa et al.; U.S. Pat. No. 6,045,151 Wu; U.S. Pat. No. 6,206,410 Brown; U.S. Pat. No. 6,254,122 Wu et al.; and U.S. Pat. No. 6,352,304 Sorgenfrei.

SUMMARY OF THE INVENTION

An object of the present invention is to provide an improved vehicle seat side air bag assembly for providing seat occupant protection.

In carrying out the above object, a vehicle seat side air bag assembly constructed in accordance with the invention includes a vehicle seat having a frame, a cushion mounted on the seat frame and a trim cover that covers the cushion and has an air bag deployment seam. An air bag module of the assembly is mounted on the seat frame and has an inflator and an air bag that is inflated by the inflator to open the deployment seam of the trim cover and extend outwardly therethrough to provide vehicle seat occupant protection. An air bag guide of the assembly that is separate component from the air bag module is made of a synthetic plastic having an inner end that is secured to the seat frame. The air bag guide includes a tubular portion that extends from its inner end or end portion adjacent the air bag module toward the trim cover. The tubular portion of the air bag guide has an unsecured outer open end that extends alongside and contacts the cushion and that is located adjacent the deployment seam of the trim cover to guide the air bag upon its inflation to the trim cover deployment seam.

The air bag assembly as disclosed has the air bag guide made of a thermoplastic elastomer.

In one embodiment, the air bag guide is fabricated from sheet plastic. This embodiment has the sheet plastic folded adjacent the inner end of the air bag guide to provide panels, and the air bag guide has connections that secure the panels to each other to provide the tubular portion of the air bag guide. The sheet plastic may also include tabs that are folded over at the connections to provide strengthening.

In another embodiment, the air bag guide is molded from synthetic plastic as one piece. It is also possible for the molded air bag guide to include a pair of panels that define the tubular portion, and the tubular portion then also includes a pair of connection seams that connect the pair of panels and have a greater thickness than the pair of panels to provide strengthening.

As disclosed, a connector extends from the air bag module outwardly through the inner end of the air bag guide to the seat frame to secure the air bag module and the inner end of the air bag guide to the seat frame. The inner end of the air bag guide receives the air bag module and includes an opening through which at least one control wire extends to the air bag module.

The objects, features and advantages of the present invention are readily apparent from the following detailed description of the preferred embodiments when taken in connection with the accompanying drawings.

BRIEF DESCRIPTION OF THE DRAWINGS

FIG. 6 is a sectional view taken through a tubular portion of the air bag guide of one construction which is made from sheet plastic and has tabs that provide strengthening of connections between panels that are provided by folding of sheet plastic.

FIG. 7 is a sectional view similar to FIG. 6 but taken through the tubular guide portion of another version of the air bag guide which is molded as one piece.

FIG. 8 is a sectional view also similar to FIG. 6 but taken through another embodiment of the tubular portion of the air bag guide which is made by molding with thickened portions that provide strengthening at connection seams of the tubular portion.

DETAILED DESCRIPTION OF THE PREFERRED EMBODIMENTS

Figure 1:
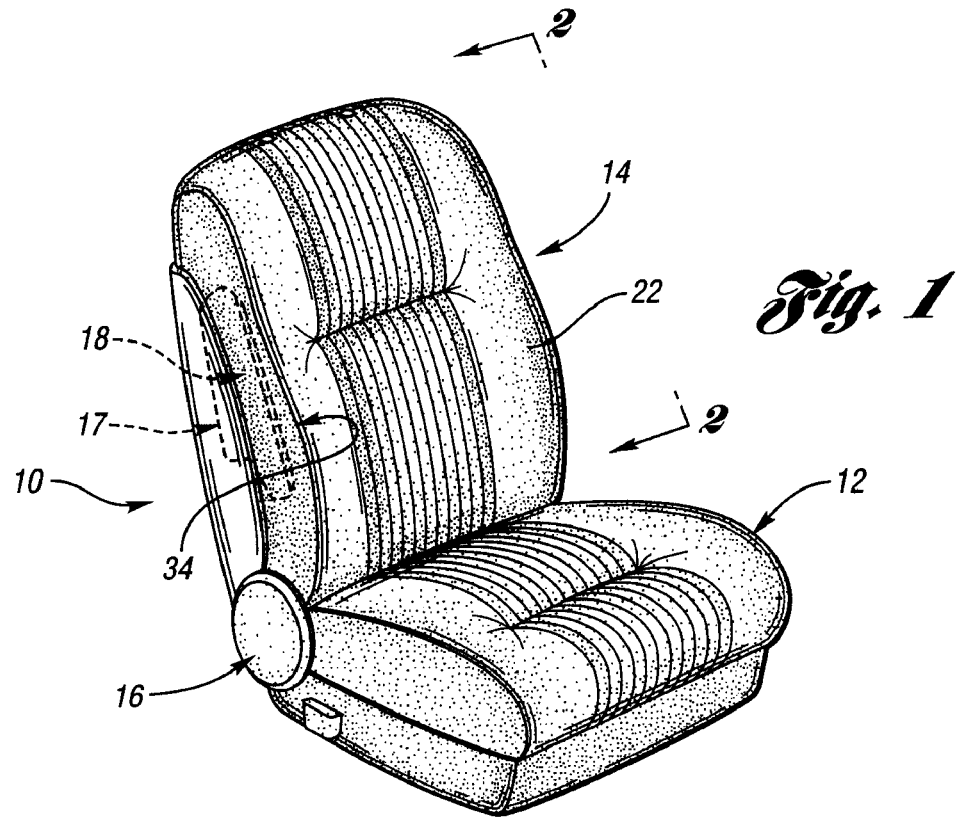
FIG. 1 is a perspective view of a vehicle seat side air bag assembly including a seat back component constructed in accordance with the invention to include a side air bag module that is shown by hidden line illustration.
Figure 2:
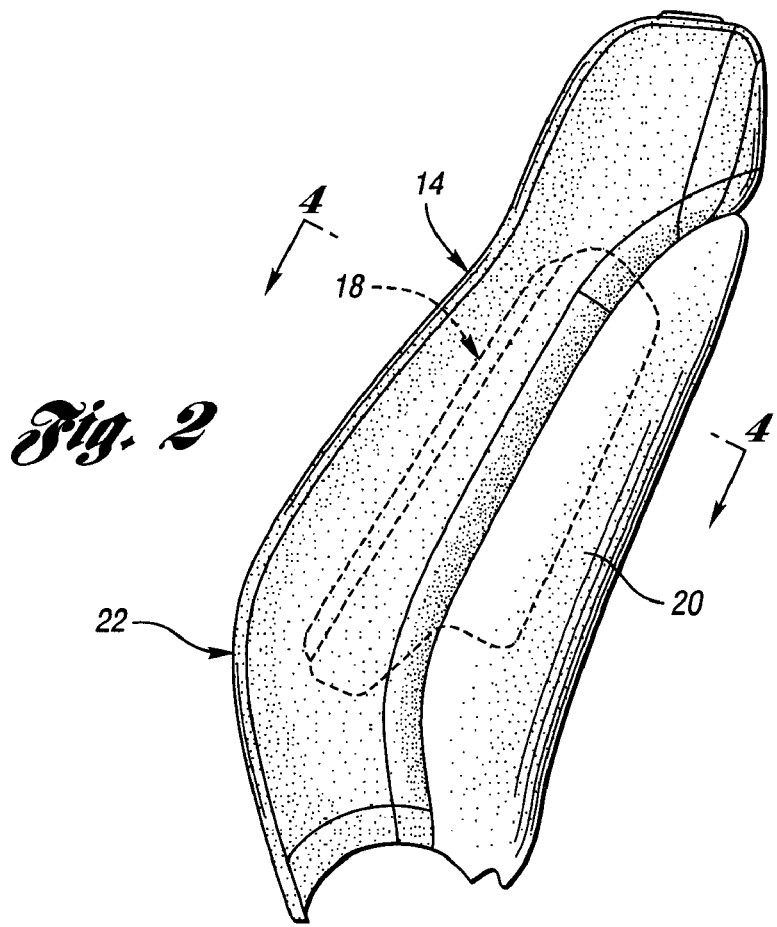
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag assembly 17 that is constructed in accordance with the present invention and includes a side air bag module 18 operable to provide seat occupant protection as is hereinafter more fully described. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that is conventionally molded from plastic and also includes a front cushion 22 against which the seat occupant leans to provide back support and in which the side air bag module 18 is located.

Figure 3:
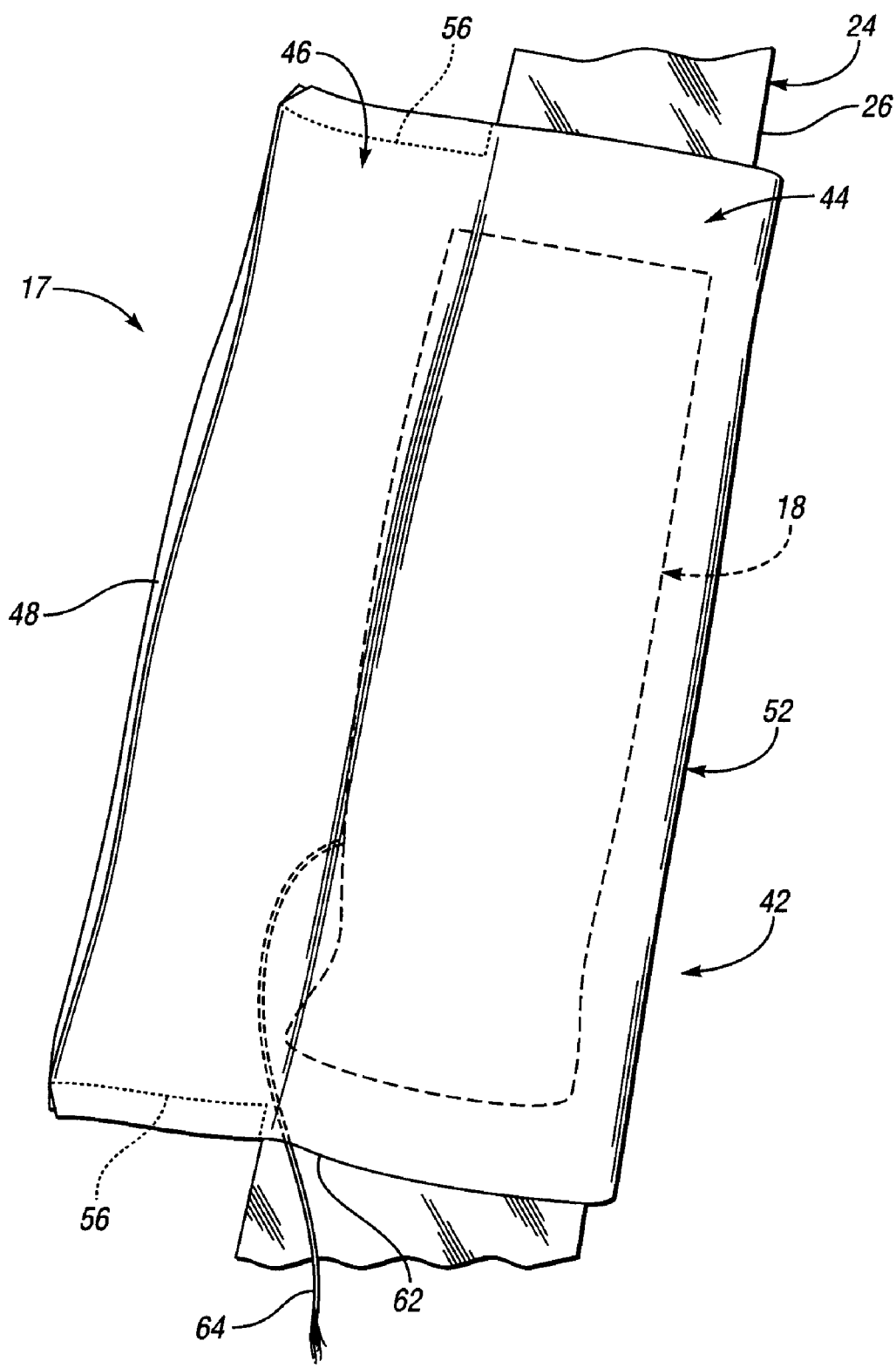
FIG. 3 is a perspective view with a seat pad and trim cover removed to illustrate the air bag module mounted on the seat frame within an air bag guide.
Figure 4:
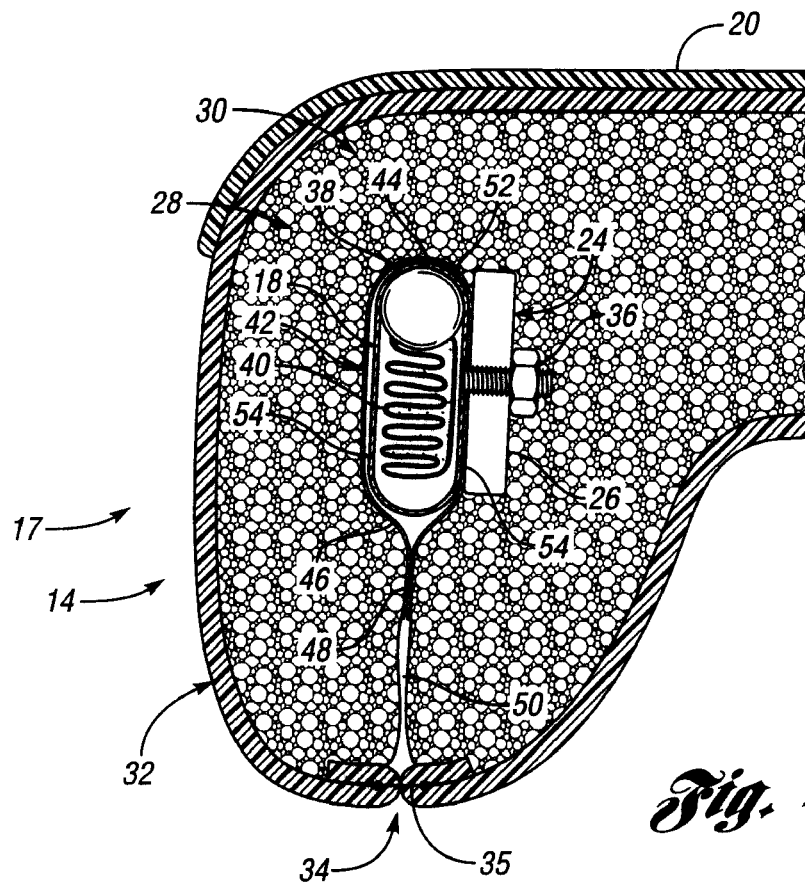
FIG. 4 is a partial sectional view taken through the seat back component along the direction of line 4-4 in FIG. 2 to illustrate one construction in which the air bag is deployed through a slit in a foam seat pad.
Figure 5:
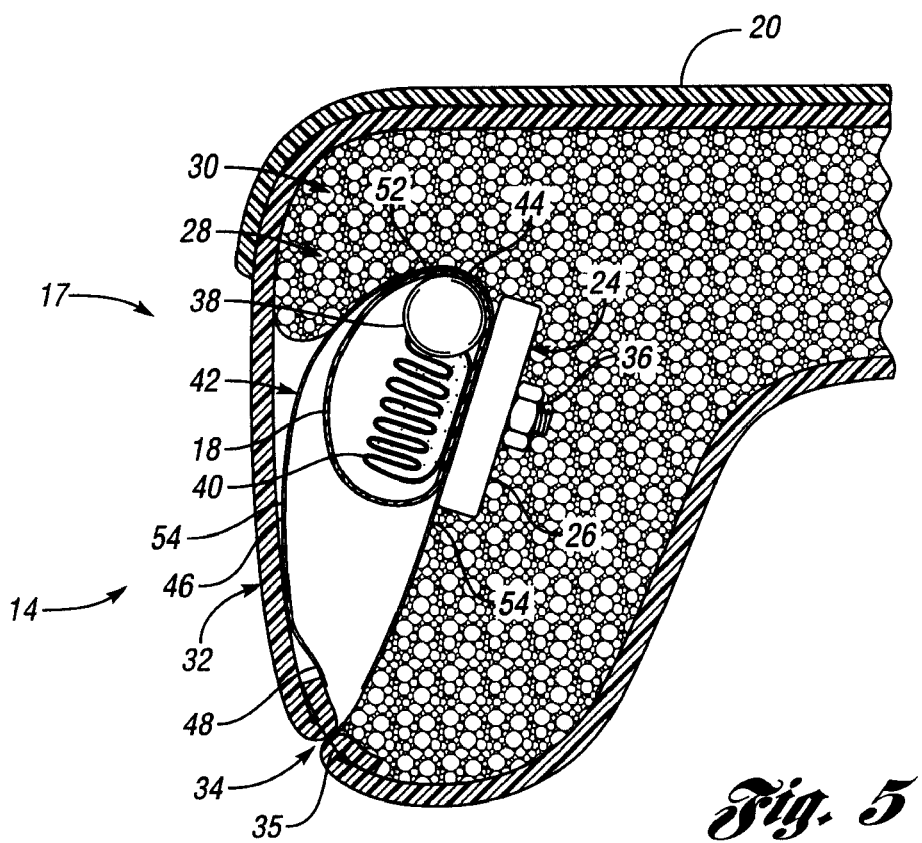
FIG. 5 is a partial view similar to FIG. 4 showing another construction in which the air bag is deployed between the foam seat pad and the seat trim cover.

As illustrated in FIGS. 3, 4 and 5, the seat back component 14 includes a frame collectively identified by 24 and having a pair of frame members 26 (only one shown) at its opposite lateral sides. A foam seat pad 28 (FIGS. 4 and 5) is mounted on the frame 24 in any conventional manner and has opposite side extremities 30 (only one shown) spaced laterally from each other at the opposite lateral sides of the seat. A trim cover generally indicated by 32 extends over the seat pad 28 and includes an air bag deployment or release seam 34 adjacent the shown side extremity 30 of the seat pad which corresponds to an outboard location. The deployment seam 34 includes stitching 35 of trim cover portions to each other.

The side air bag module 18 is located within the trim cover 32 mounted on the frame 24, specifically by a threaded connection 36 on the one side frame member 26 adjacent the air bag release seam 34 but in a spaced relationship from the release seam. The air bag module 18 includes an inflator 38 and a schematically illustrated air bag 40 which may be folded or rolled and, upon deployment, the air bag is inflated by the inflator and projected outwardly from the seat component through the air bag deployment seam 34 of the trim cover 32.

The trim cover 32 may be made of cloth, vinyl or leather, etc. In some embodiments, the trim cover 32 within the back panel 20 includes an extension secured thereto by stitching and/or adhesive, etc. for securement to the seat component structure in any suitable manner. Such trim cover extensions can be made of any sufficiently strong and flexible material and can reduce the total cost of the trim cover without losing any aesthetic appeal since the back panel 20 hides the trim cover extension.

As shown in FIGS. 3-5, the side air bag assembly 17 includes an air bag guide 42 which is made of a synthetic plastic and has an inner end 44 that is secured to the seat frame 24 at its side frame member 26 as is hereinafter more fully described. The air bag guide 42 also includes a tubular or guide portion 46 that extends from its inner end or end portion 44 adjacent the air bag module toward the trim cover 32 at its deployment seam 34. The tubular portion 46 of the air bag guide 42 has an unsecured outer open end 48 adjacent the deployment seam 34 of the trim cover 32 to guide the air bag 40 upon its inflation to the trim cover deployment seam. In the embodiment of FIG. 4, the foam seat pad 30 surrounds the seat frame member 26 and the air bag module 18 and the air bag guide 40 and has a slit 50 that extends from the open end 48 of the air bag guide tubular portion 46 to the deployment seam 34. In the embodiment of FIG. 5, the foam seat pad 28 is located on the inboard and rear side of the air bag module 18 and the air bag guide 42, and the trim cover 32 is located on the outboard side of the air bag guide 42. In both embodiments and the other disclosed embodiments of the air bag guide 42, the tubular construction of the tubular portion 46 is maintained throughout the air bag deployment.

The air bag guide 42 is made of a thermoplastic elastomer and may be a thermoplastic olefinic elastomer, a thermoplastic vulcanized elastomer or a styrene olefin.

As illustrated in FIG. 3, the air bag guide 42 is fabricated from a plastic sheet 52. This plastic sheet is folded adjacent the inner end 44 of the air bag guide to provide panels 54 as shown in FIGS. 4 and 5, and the panels 54 as shown in FIG. 3 have connections 56 that secure the panels to each other to provide the tubular portion 46 extending from the air bag module to the outer open end 48. These connections 56 may be made by stitching, heat bonding, adhesive or in any other suitable way for maintaining the panel securement throughout the air bag deployment.

As shown in FIG. 6, the plastic sheet 52 may also have tabs 58 that are folded over at the connections 56 to provide strengthening of the securement of the panels to each other throughout the air bag deployment.

As illustrated in FIG. 7, the air bag guide 42 for high production can be economically molded to provide the previously described inner end 46 shown in FIG. 3 and the tubular guide portion 46 shown in FIG. 7. This molding can be performed by either injection molding or blow molding as one piece. Also, the junctions 60 of the molded panels 54 of the tubular portion 46 may have thickened portions, rib, etc. to provide strengthening of the securement of the panels to each other throughout the air bag deployment.

As illustrated in FIG. 8, it is also possible for the air bag guide 42 to be molded as two components 42c, unlike the single piece shown in FIG. 7, that are secured to each other by the connections 56 of the tubular portion 42 and in a suitable way at the inner end of the air bag guide. These molded portions 42c may have a thickened construction, ribs etc. at the connections 56 of the tubular portion and at a suitable connection of the inner end of the air bag guide.

In each embodiment illustrated in FIGS. 4-7, the inner end 44 of the air bag guide as specifically shown in FIGS. 4 and 5 receives the air bag module 18 with the threaded connection 36 extending through a suitable hole in one of the sides of the air bag guide to provide a clamping securement of the inner end to the seat frame member 26. Also, as shown in FIG. 3, the inner end 44 of the air bag guide 42 includes an opening 62 through which at least one control wire 64 extends to the air bag module 18 to control its deployment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat side air bag assembly comprising:
   a vehicle seat having a frame, a cushion mounted on the seat frame and a trim cover that covers the cushion and has an air bag deployment seam;
   an air bag module mounted on the seat frame and having an inflator and an air bag that is inflated by the inflator to open the deployment seam of the trim cover and extend outwardly therethrough to provide vehicle seat occupant protection; and an air bag guide that is a separate component from the air bag module and that is made of a synthetic plastic and has an inner end that is secured to the seat frame, the air bag guide including a tubular portion that extends from its inner end adjacent the air bag module toward the trim cover, and the tubular portion of the air bag guide having an unsecured outer open end that extends alongside and contacts the cushion and that is located adjacent the deployment seam of the trim cover to guide the air bag upon its inflation to the trim cover deployment seam.

2. A vehicle seat air bag assembly as in claim 1 wherein the air bag guide is made of a thermoplastic elastomer.

3. A vehicle seat air bag assembly as in claim 1 wherein the air bag guide is fabricated from sheet plastic.

4. A vehicle seat air bag assembly as in claim 3 wherein sheet plastic is folded adjacent the inner end of the air bag guide to provide panels, and the air bag guide including connections that secure the panels to each other to provide the tubular portion.

5. A vehicle seat air bag assembly as in claim 4 wherein the sheet plastic includes tabs that are folded over at the connections to provide strengthening.

6. A vehicle seat air bag assembly as in claim 1 wherein the air bag guide is molded.

7. A vehicle seat air bag assembly as in claim 6 wherein the molded air bag guide includes a pair of panels that define the tubular portion, and the tubular portion also including a pair of connection seams that connect the pair of panels and have a greater thickness than the pair of panels to provide strengthening.

8. A vehicle seat air bag assembly as in claim 1 further including a connector that extends from the air bag module outwardly through the inner end of the air bag guide to the seat frame to secure the air bag module and the inner end of the air bag guide to the seat frame.

9. A vehicle seat air bag assembly as in claim 1 wherein the inner end of the air bag guide receives the air bag module.

10. A vehicle seat air bag assembly as in claim 9 wherein the inner end of the air bag guide includes an opening through which at least one control wire extends to the air bag module.

11. A vehicle seat side air bag assembly comprising:
a vehicle seat having a frame, a cushion mounted on the seat frame and a trim cover that covers the cushion and has an air bag deployment seam;
an air bag module mounted on the seat frame and having an inflator and an air bag that is inflated by the inflator to open the deployment seam of the trim cover and extend outwardly therethrough to provide vehicle seat occupant protection; and
an air bag guide that is a separate component from the air bag module and that is made of a thermoplastic elastomer and has an inner end that is secured to the seat frame and receives the air bag module, the air bag guide including a tubular portion that extends from adjacent the air bag of the air bag module toward the trim cover, and the tubular portion of the air bag guide having an unsecured outer open end that extends alongside and contacts the cushion and that is located adjacent the deployment seam of the trim cover to guide the air bag upon its inflation to the trim cover deployment seam.

12. A vehicle seat side air bag assembly comprising:
a vehicle seat having a frame, a cushion mounted on the seat frame and a trim cover that covers the cushion and has an air bag deployment seam;
an air bag module mounted on the seat frame and having an inflator and an air bag that is inflated by the inflator to open the deployment seam of the trim cover and extend outwardly therethrough to provide vehicle seat occupant protection;
a connector that secures the air bag module to the seat frame; and
an air bag guide that is a separate component from the air bag module and that is made of a thermoplastic elastomer and has an inner end that receives the air bag module and that is secured by the connector between the seat frame and the air bag module in a clamped manner, the air bag guide including a tubular portion that extends from adjacent the air bag module air bag toward the trim cover, and the tubular portion of the air bag guide having an unsecured outer open end that extends alongside and contacts the cushion and that is located adjacent the deployment seam of the trim cover to guide the air bag upon its inflation to the trim cover deployment seam.

13. A vehicle seat side air bag assembly comprising:
a vehicle seat having a frame, a cushion mounted on the seat frame and a trim cover that covers the cushion and has an air bag deployment seam;
an air bag module mounted on the seat frame and having an inflator and an air bag that is inflated by the inflator to open the deployment seam of the trim cover and extend outwardly therethrough to provide vehicle seat occupant protection; and
an air bag guide that is a separate component from the air bag module and that is molded as one piece from a synthetic plastic and has an inner end portion that is secured to the seat frame, the air bag guide including a guide portion that extends from its inner end portion adjacent the air bag module toward the trim cover, the guide portion of the air bag guide having an unsecured outer open end that extends alongside and contacts the cushion and that is located adjacent the deployment seam of the trim cover to guide the air bag upon its inflation to the trim cover deployment seam, and the air bag guide including a pair of panels having connections to each other between the inner end portion and the outer open end.

14. A vehicle seat air bag assembly as in claim 13 wherein the inner end portion of the air bag guide receives the air bag module and includes an opening through which at least one control wire can extend to the air bag module.

* * * * *